United States Patent
Zirwas et al.

(10) Patent No.: US 10,904,040 B2
(45) Date of Patent: Jan. 26, 2021

(54) CHANNEL ESTIMATION IN COMMUNICATIONS

(71) Applicant: NOKIA SOLUTIONS AND NETWORKS OY, Espoo (FI)

(72) Inventors: Wolfgang Zirwas, Munich (DE); Berthold Panzner, Holzkirchen (DE); Rakash Sivasiva Ganesan, Unterhaching (DE); Markus Staudacher, Munich (DE); Gerhard Kramer, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 94 days.

(21) Appl. No.: 15/778,381

(22) PCT Filed: Nov. 26, 2015

(86) PCT No.: PCT/EP2015/077808
§ 371 (c)(1),
(2) Date: May 23, 2018

(87) PCT Pub. No.: WO2017/088925
PCT Pub. Date: Jun. 1, 2017

(65) Prior Publication Data
US 2018/0324003 A1 Nov. 8, 2018

(51) Int. Cl.
*H04B 7/06* (2006.01)
*H04B 7/26* (2006.01)
(Continued)

(52) U.S. Cl.
CPC ......... *H04L 25/0204* (2013.01); *H01Q 21/22* (2013.01); *H04B 7/0417* (2013.01);
(Continued)

(58) Field of Classification Search
CPC .... H01Q 21/22; H04B 7/0417; H04B 7/0626; H04B 7/066; H04B 7/265; H04B 7/0691;
(Continued)

(56) References Cited

U.S. PATENT DOCUMENTS 7,948,444 B2 * 5/2011 Signell ................. H01Q 1/246
343/700 MS
9,154,205 B2 * 10/2015 Kim .................... H04B 7/0456
(Continued)

OTHER PUBLICATIONS

International Search Report and Written Opinion for International Application No. PCT/EP2015/077808, dated Aug. 17, 2016, 2 pages.
(Continued)

*Primary Examiner* — Ahmed Elallam

(57) ABSTRACT

A method is provided for channel estimation of an antenna array comprising multiple antenna elements. The method comprises obtaining channel state information for antenna elements with a high-end radio frequency chain, wherein the antenna elements with the high-end radio frequency chain are placed in the antenna array intermittently with antenna elements with a low-cost radio frequency chain. Channel state information is estimated for the antenna elements with the low-cost radio frequency chain, by interpolating the channel state information obtained for the antenna elements with the high-end radio frequency chain.

15 Claims, 12 Drawing Sheets

(51) Int. Cl.
  *H01Q 21/22* (2006.01)
  *H04L 25/02* (2006.01)
  *H04B 7/0417* (2017.01)
  *H04L 1/00* (2006.01)

(52) U.S. Cl.
  CPC .......... *H04B 7/066* (2013.01); *H04B 7/0626* (2013.01); *H04B 7/265* (2013.01); *H04L 1/0026* (2013.01)

(58) Field of Classification Search
  CPC ........ H04B 7/04; H04B 7/0452; H04B 7/046; H04B 7/0469; H04L 1/0026; H04L 25/0204; H04L 5/0023; H04L 25/0224
  See application file for complete search history.

(56) References Cited

U.S. PATENT DOCUMENTS

| | | | |
|---|---|---|---|
| 9,231,676 B2 * | 1/2016 | Zirwas | H04B 7/0691 |
| 9,647,735 B2 * | 5/2017 | Sajadieh | H04W 4/70 |
| 9,794,817 B2 * | 10/2017 | Ko | H04B 7/0626 |
| 2010/0087151 A1 | 4/2010 | Auer | |
| 2011/0205930 A1 * | 8/2011 | Rahman | H04B 7/0417 |
| | | | 370/252 |
| 2013/0308714 A1 | 11/2013 | Xu et al. | |
| 2015/0092875 A1 * | 4/2015 | Kim | H04B 7/0478 |
| | | | 375/267 |
| 2015/0356285 A1 | 12/2015 | Glaser | |
| 2016/0021551 A1 * | 1/2016 | Park | H04B 7/0619 |
| | | | 370/328 |
| 2016/0080052 A1 * | 3/2016 | Li | H04L 5/005 |
| | | | 375/267 |
| 2016/0134323 A1 * | 5/2016 | Bengtsson | H01Q 3/30 |
| | | | 455/562.1 |
| 2016/0135180 A1 * | 5/2016 | Yuan | H04B 7/0617 |
| | | | 370/329 |
| 2018/0152324 A1 * | 5/2018 | Park | H04B 17/309 |
| 2018/0269945 A1 * | 9/2018 | Zhang | H04W 76/27 |

OTHER PUBLICATIONS

Mo et al.; Channel Estimation in Millimeter Wave MIMO Systems with One-Bit Quantization; 48th Asilomar Conference on Signals, Systems and Computers; Nov. 2-5, 2014; Pacific Grove, CA, USA; pp. 957-961.

* cited by examiner

CHANNEL ESTIMATION IN COMMUNICATIONS

CROSS-REFERENCE TO RELATED APPLICATIONS

This application is a national stage entry of PCT Application No. PCT/EP2015/077808 filed Nov. 26, 2015, entitled "CHANNEL ESTIMATION IN COMMUNICATIONS" which is hereby incorporated by reference in its entirety.

TECHNICAL FIELD

The invention relates to communications.

BACKGROUND

A low-cost implementation of massive MIMO antenna arrays, possibly with a hundred or more antenna elements, has been proposed, combining many low-effort RF chains having very limited capabilities like restricted analogue-digital converters (ADC) with only single-bit quantization and/or limited Tx power together with a few high-end RF chains (TXRU). The combination of low-cost frontends with high-accuracy RF chains enables achieving a high performance due to the high-end TXRU, while at the same time maintaining low costs due to a high number of extremely low cost RF chains.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which.

DETAILED DESCRIPTION OF SOME EMBODIMENTS

Figure 1:
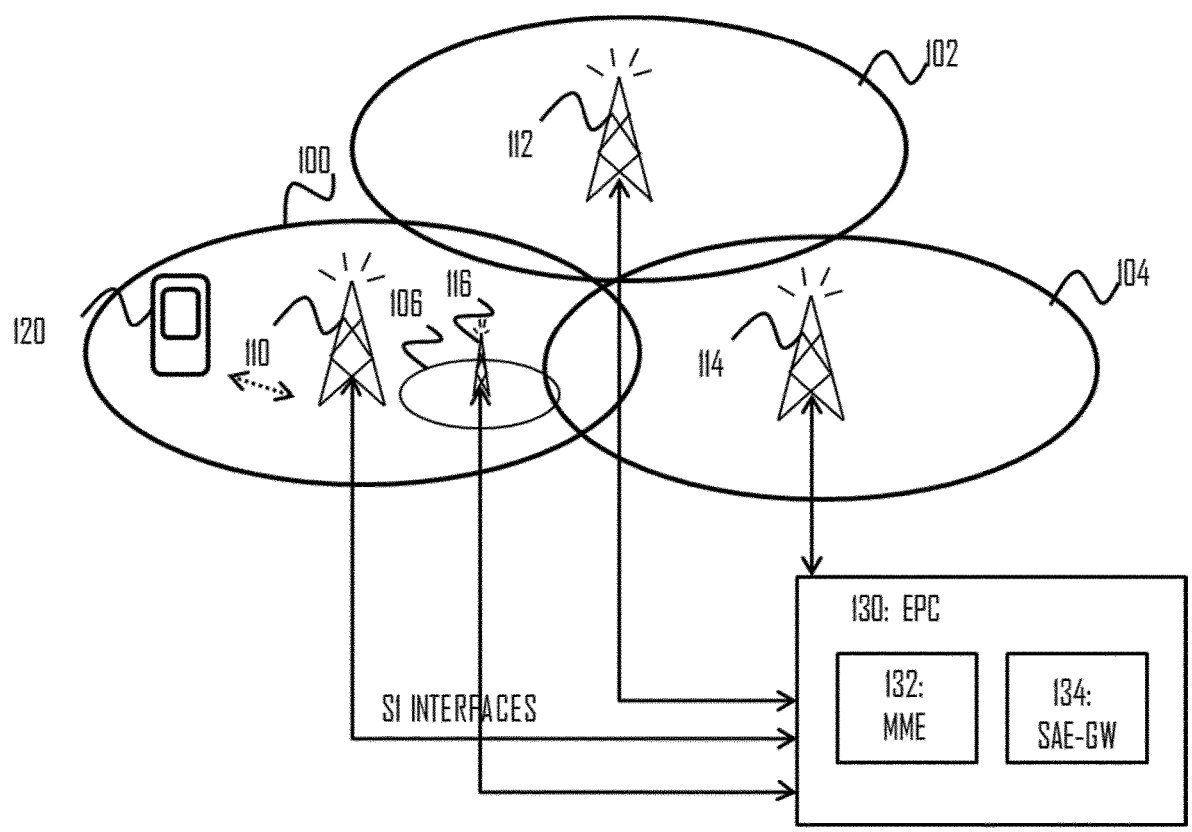
FIG. 1 illustrates a wireless communication system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: universal mobile telecommunication system (UMTS, 3G) based on basic wideband-code division multiple access (W-CDMA), high-speed packet access (HSPA), long term evolution (LTE), LTE-advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input—multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are software-defined networking (SDN), big data, and all-IP, which may change the way networks are being constructed and managed.

FIG. 1 illustrates an example of a cellular communication system to which embodiments of the invention may be applied. Cellular radio communication networks, such as the long term evolution (LTE), the LTE-advanced (LTE-A) of the 3rd generation partnership project (3GPP), or the predicted future 5G solutions, are typically composed of at least one network element, such as a network element 110, providing a cell 100. Each cell may be, e.g. a macro cell, a micro cell, femto, or a pico cell, for example. The network element 110 may be an evolved node-B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support dual connectivity (DC) in which the terminal device 120 has established multiple connections with cells associated with a master eNB network element and a secondary eNB network element.

The network element 110 may employ carrier aggregation in which the terminal device 112 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, the eNBs may be connected to each other with an X2 interface as specified in LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134.

The radio system of FIG. 1 may support machine type communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. The at least one terminal device 120 may also comprise another MTC capable device, such as a sensor device providing position, acceleration and/or temperature information to name a few examples.

For proper single-user or multiple-user MIMO precoding for future 5G systems, accurate channel knowledge is required for each antenna element, i.e. for antenna elements with full RF chains, as well as for antenna elements with low-cost RF-chains. Single-bit DACs for a downlink transmit RF part may be combined with powerful multiple-bit ADCs in an uplink receiver RF chain, but this increases the cost and power consumption of the low-cost RF chains. Therefore, Rx (like Tx complexity) may be limited to the single-bit ADCs. In that case, however, accurate wideband estimation of the radio channels may become challenging. In case of TDD, sounding reference signals transmitted from UEs, are not correctly receivable. In case of FDD, it is difficult to transmit suitable CSI RSs in a regular grid over a full frequency bandwidth.

Channel estimation for RF frontends using only single-bit ADC/DACs may involve multiple transmissions of pilot signals, wherein at each time instant the power of the pilot signals are varied in an appropriate way. Alternatively or in addition to that, the receiver may change a threshold for a plus and minus bit of the single-bit ADC for each retransmission, such that finally the received power of the pilot signal—and accordingly the channel state information of the radio channel—may be determined with certain accuracy. This may require several time instances, and may therefore require some time and some extra energy. In addition, this may require frequency flat radio channels, or a complex analogue filter bank with multiple single-bit ADCs.

Figure 11:
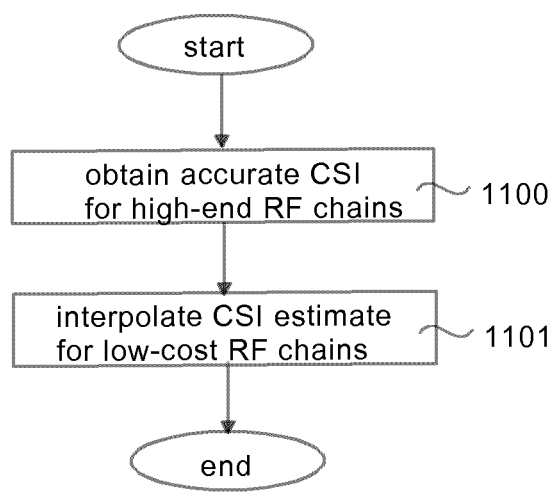
FIG. 11 illustrates a process for channel estimation according to an embodiment of the invention.

FIG. 11 illustrates an embodiment for channel estimation of an antenna array in communications, the antenna array comprising multiple antenna elements. Referring to FIG. 11, the method comprises obtaining (item 1100) channel state information for antenna elements with a high-end radio frequency chain. The antenna elements with the high-end radio frequency chain are placed in the antenna array intermittently with antenna elements with a low-cost radio frequency chain. The low-cost radio frequency chain may comprise a low-performance radio frequency chain, such as a single-bit radio frequency chain, a two-bit radio frequency chain, a low-bit (few-bit) radio frequency chain, lower-linearity radio frequency chain, or some other low-effort/lower-functionality/lower-performance radio frequency chain. The high-end radio frequency chain may comprise a full radio frequency chain, an almost full radio frequency chain, a high-performance (higher-performance/higher-functionality) radio frequency chain, a high-effort radio frequency chain, a high-bit radio frequency chain, higher-linearity radio frequency chain, or any other radio frequency chain that has better functionality compared to the low-cost (low-performance) radio frequency chain. The method further comprises estimating (item 1101) channel state information for the antenna elements with the low-cost radio frequency chain, by interpolating the channel state information obtained for the antenna elements with the high-end radio frequency chain. The antenna elements with the high-end radio frequency chain may be placed in the antenna array in a regular grid with the antenna elements with the low-cost radio frequency chain. The interpolating may be performed over an azimuth direction of the antenna array, over an elevation direction of the antenna array, or over some other direction of the antenna array.

Figure 2:
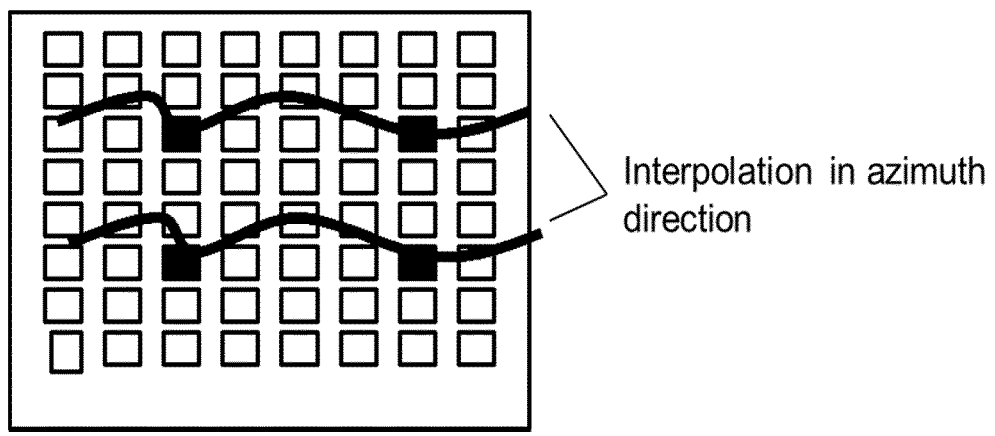
FIG. 2 illustrates interpolation over an azimuth direction of an antenna array according to an embodiment.

Thus an embodiment enables channel estimation for antenna arrays combining low-cost and high-end RF chains. The channel state information (CSI) for the antenna elements with low-cost ADCs is interpolated (instead of estimating) using available CSI estimates for the antenna elements with high-end RF chains. Therefore, the full RF antenna elements may be placed in a regular grid intermittently with the low-cost antenna elements, so that the interpolation is possible. This is further illustrated in FIG. 2 for the azimuth direction by the curves, wherein the accurate CSI is available at the full RF frontends, and the intermediate antenna elements are being interpolated. Knowledge of the relative placements of the antenna elements is assumed to be given. FIG. 2 illustrates the interpolation over the azimuth direction of an antenna array based on the wideband channel estimation at the full RF antenna elements. The black curves represent the exact knowledge of CSI—i.e. phase and amplitude—at the (black quadratic) full RF frontends and interpolation for the intermediate 1-bit ADC (small white quadratic) RF frontends.

Figure 6:
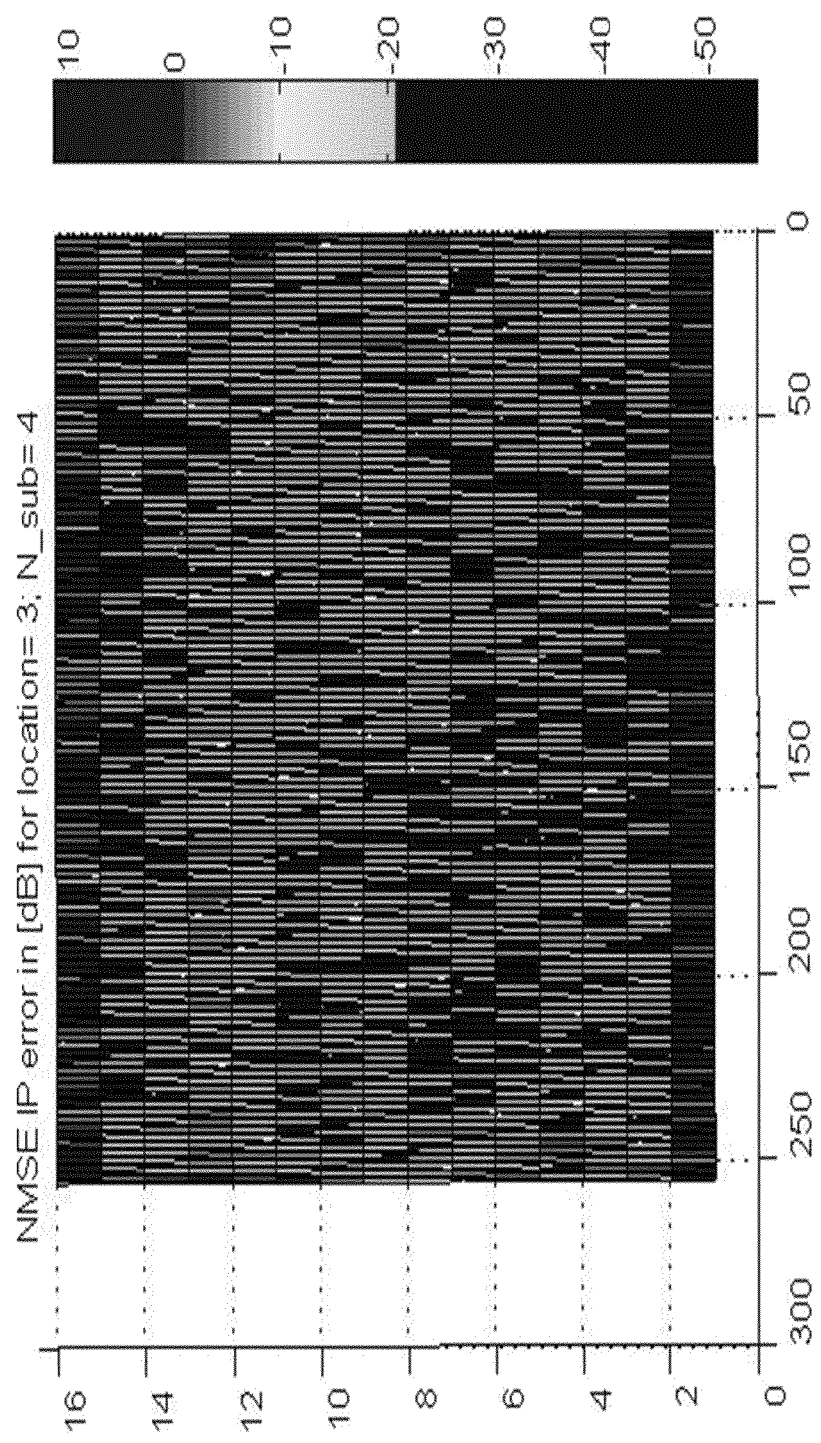
FIG. 6 illustrates NMSE for an interpolated CTF according to an embodiment.
Figure 7:
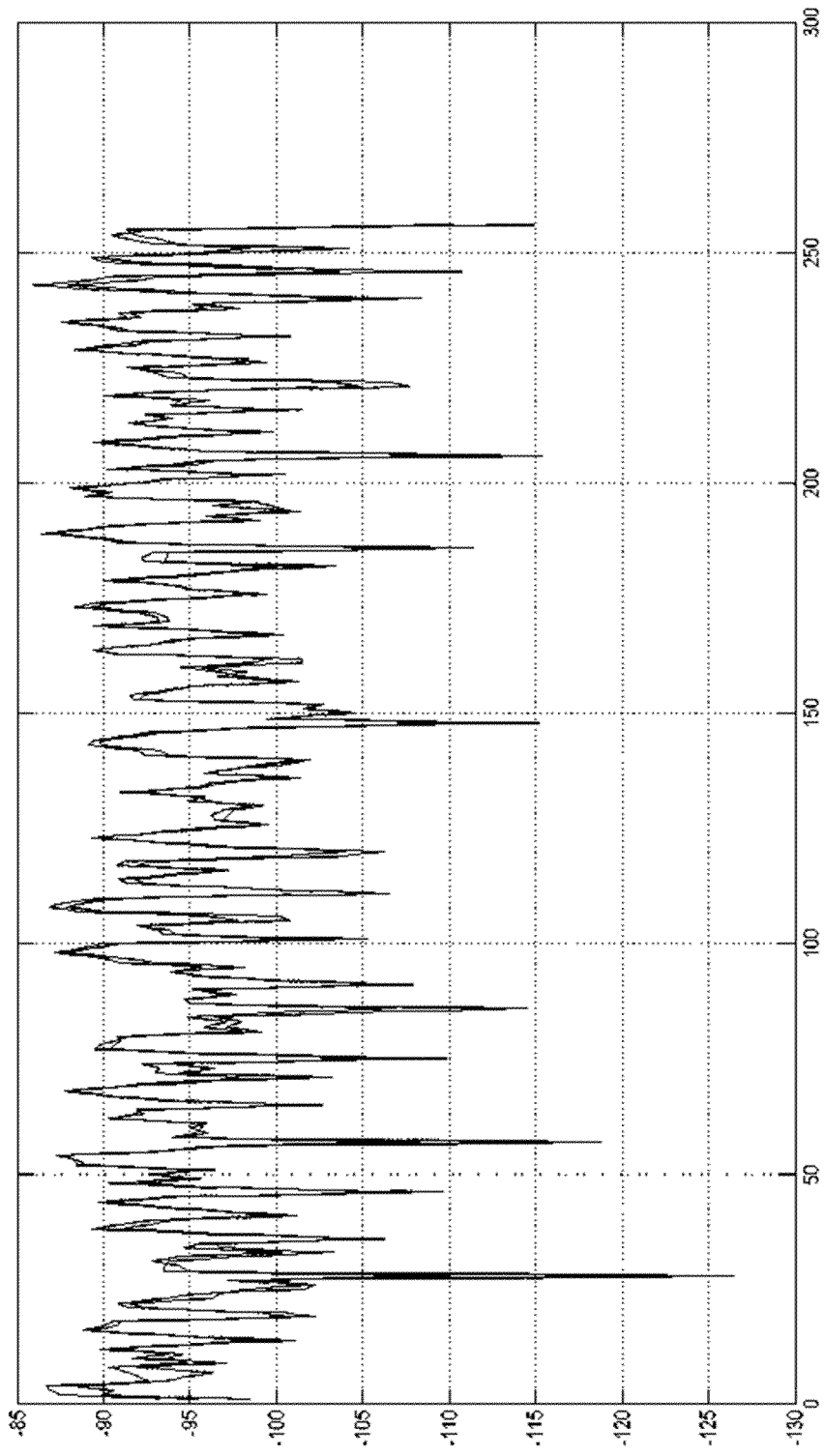
FIG. 7 illustrates amplitude of an interpolated CTF versus an ideal CTF according to an embodiment.

FIG. 6 illustrates NMSE in [dB] for interpolated CTF over bandwidth of 20 MHz (256 CSI reference signals with a spacing of 90 KHz at x-axis) for 16 antenna elements (y-axis). FIG. 7 illustrates the amplitude in [dB] of the interpolated CTF versus the ideal CTF over 256 reference signals spanning a bandwidth of 20 MHz for ULA with a subsampling factor of 4 (i.e. every 4th antenna element has a full RF chain).

In an embodiment, a normalized mean square error (NMSE) for the estimated CSI close to −20 dB may be achieved, at least for inner antenna elements (see FIG. 6). The respective channel transfer function (CTF)—herein the amplitude over frequency—for the interpolated and the ideal CSI is illustrated in FIG. 7, indicating a strong and good correlation.

In an embodiment, the low-cost ADCs are not able to resolve any amplitude values, but allow estimating the phase of Rx signals in case the Rx signal is, for example, a single sinus or rectangular signal (or a signal of some other suitable signal type). That may be used to estimate the phase of the wideband radio channel by sequentially transmitting single-frequency reference signals (e.g. a single RS subcarrier per OFDM symbol). The frequency per RS subcarrier is then changed from one transmission to the next, till the full bandwidth has been sampled. Herein, TDD is being assumed, so that each low-cost RF element is able to estimate its phase value from a single UE Tx signal. This information may be combined with the interpolated CTF, e.g. the information may be used to correct potential phase estimation errors for the interpolated CTF.

In an embodiment, a similar approach may be used for calibration of the low-cost RF frontend Tx and Rx chains which are additionally needed for obtaining a proper precoding performance.

In an embodiment, as an alternative, the above feature of having asymmetric RF chains may be used. A low-cost DAC may be used for the DL transmission and a high-end ADC in the UL Rx chain, as Rx chains are typically less costly than Tx chains requiring high-end and high power amplifiers.

In an embodiment, as another alternative, sample and hold devices may be included in the low-cost antenna elements. The received signals may be stored as analogue samples, and these values may be read out in a time-multiplexed manner by one or more available high-end ADCs from the full RF frontends. This may be carried out by using subsampling as an appropriate combination of regular interpolation improved from time-to-time by means of accurate measurements.

Figure 3:
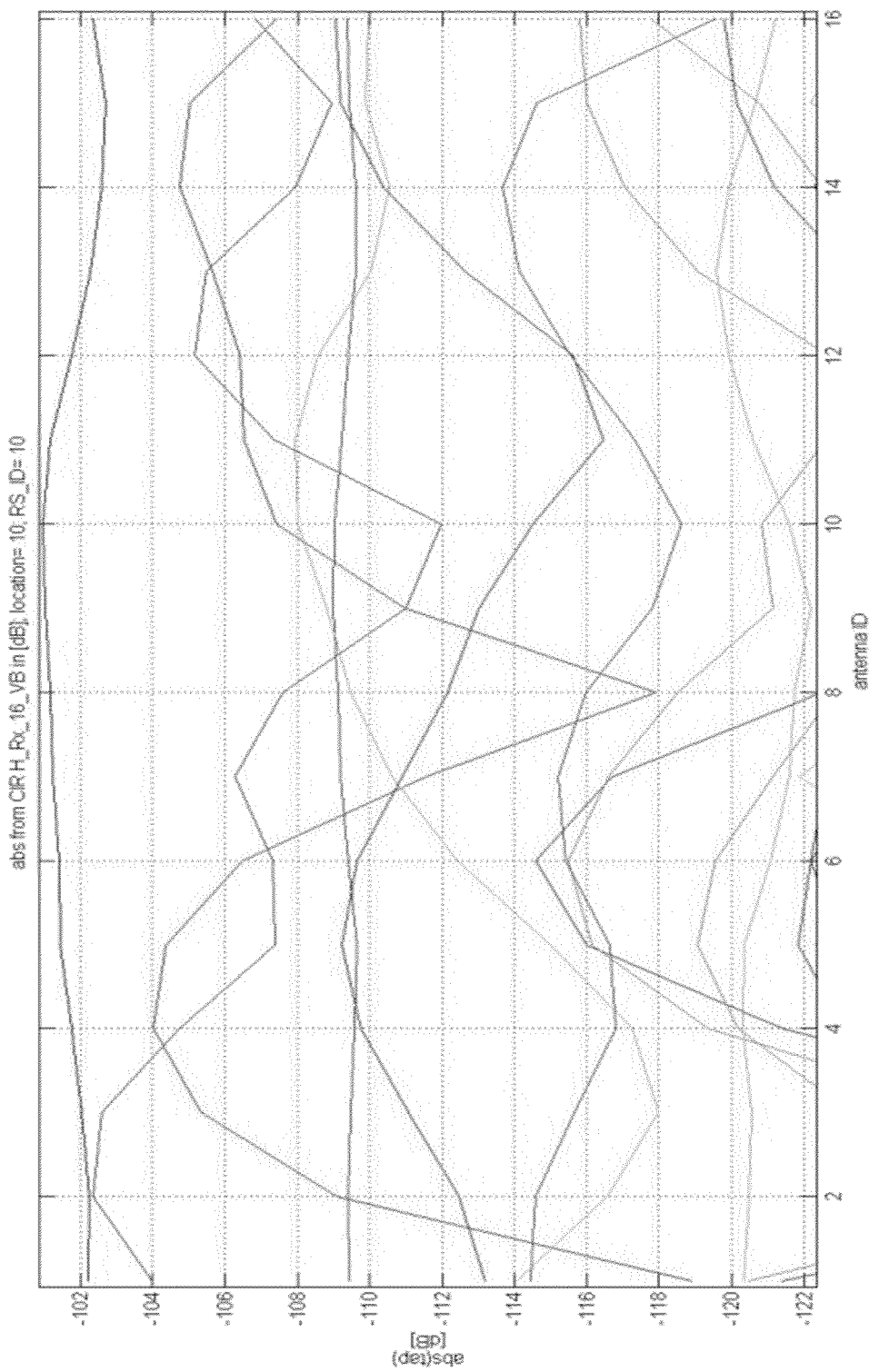
FIGS. 3, 4 and 5 illustrate amplitude evolution of CIR according to some embodiments.

FIG. 3 illustrates an evolution of the amplitude of relevant taps in [dB] of CIR over 16 antenna elements of ULA with $\lambda/2$ spacing for an antenna array below rooftop. The interpolation may require that a sampling theorem is being fulfilled. To check typical channel conditions in urban macro environments, ray-tracing simulations have been performed by using a model of a campus area in the city centre of Munich. For a first evaluation, a link between a single macro antenna at a height of 35 m and an ULA 16 antenna array placed about 300 m away in a typical NLOS condition at a height of about 2 m has been used. The evolution of the amplitude of relevant taps in [dB] of the respective CIR over the 16 antenna elements are found in FIG. 3, demonstrating for many of the relevant taps a strong variation over the antenna elements. This may be explained by the large number of relevant multipath components together with a large angle of arrival spread at UE locations. The respective interpolation performance has been found to be quite poor.

Figure 4:
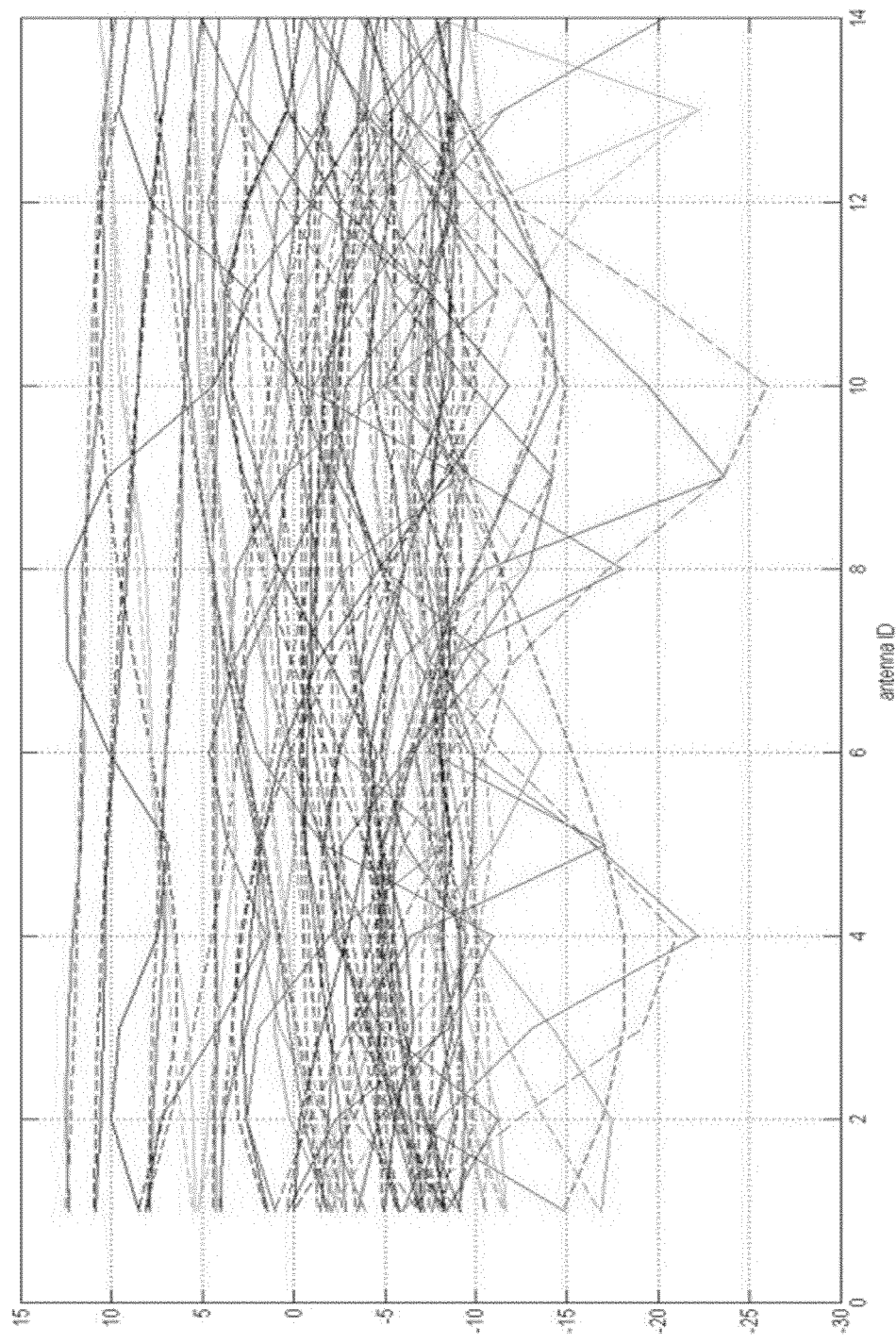
Figure 8:
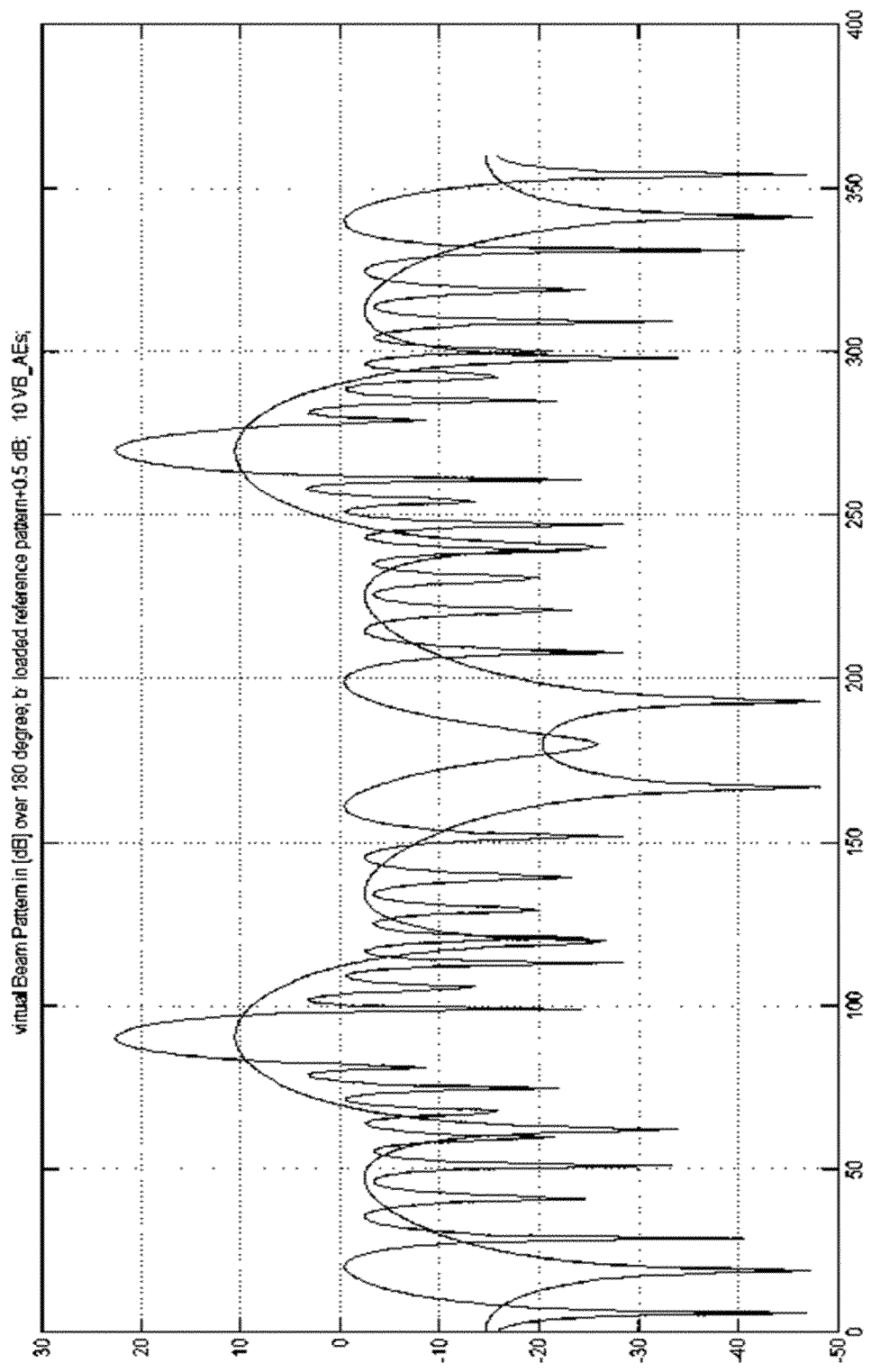
FIG. 8 shows an UE antenna beam pattern according to an embodiment.

FIG. 4 illustrates an evolution of the amplitude of the relevant taps in [dB] of CIR over 14 out of the 16 antenna elements of ULA with $\lambda/2$ spacing at a typical macro site and NLOS UE at 300 m distance using virtual beamforming and artificial mutual coupling. The dashed lines illustrate the respective interpolated values. For example, the strongest tap illustrates strong correlation between the solid and dashed lines. The result looks much better in FIG. 4 (compared to FIG. 3), and the reason is that now the 16 element ULA has been placed at the macro's site at a height of 35 m, and in addition UE performs strong beamforming over 24 physical and/or virtual antenna elements which, on top of this, use artificial mutual coupling. A similar beam pattern for 10 virtual antenna elements may be found in FIG. 8 illustrating how artificial mutual coupling generates very narrow Rx beams, and is therefore a possible technique for 5G. FIG. 8 shows an UE antenna beam pattern over an azimuth angle in degree for 10 physical or virtual antenna elements, and a beam pattern for additional mutual coupling on top of the 10 antenna elements.

Figure 5:
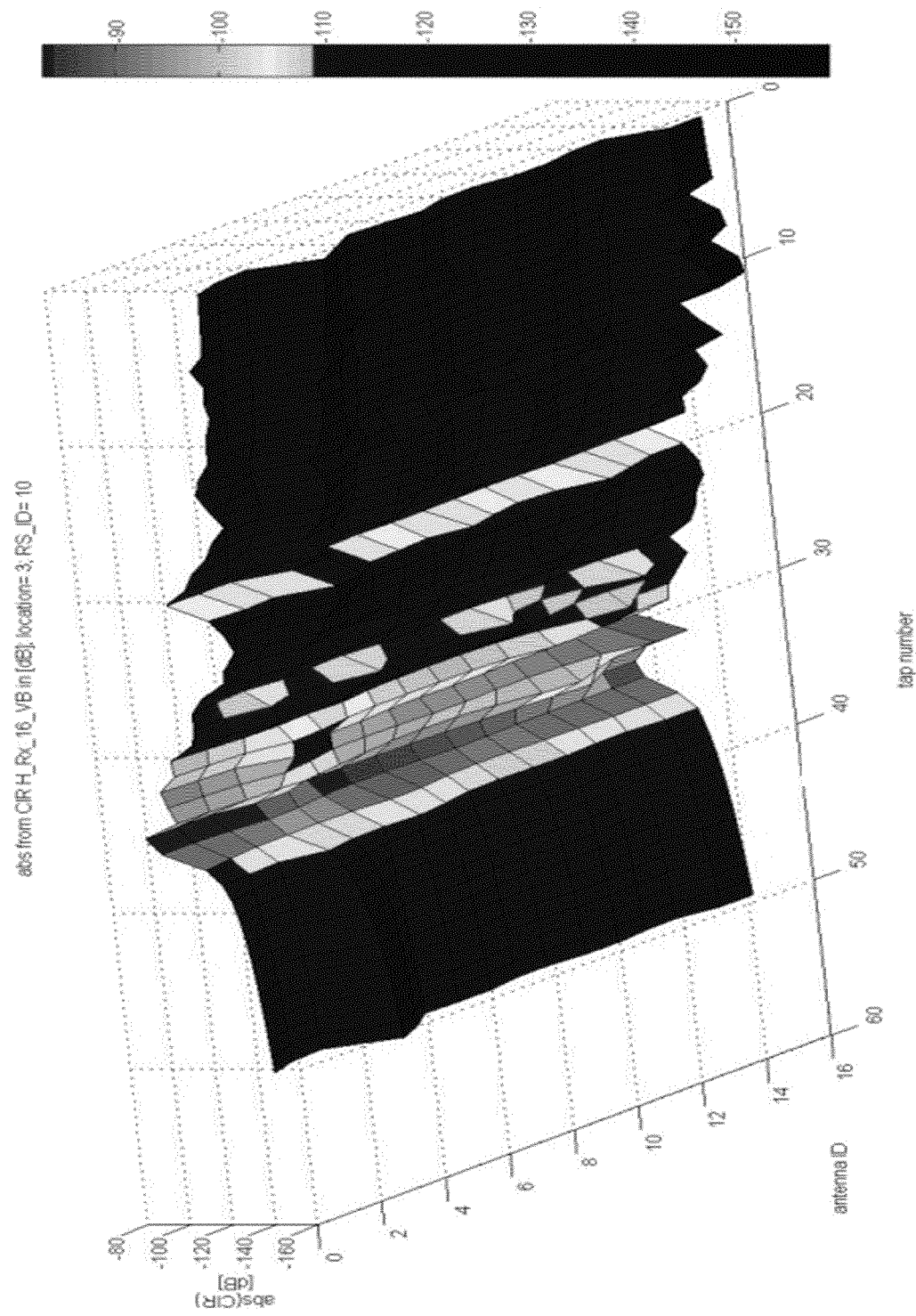

In an embodiment, multipath components impinging the antenna array and received for typical macro sites are interpolated with a low to moderate angular spread. Knowing the relevant multipath components and their direction of arrival enables a simple and powerful interpolation. Reducing the number of relevant multipath components by virtual beamforming and artificial mutual coupling as described above may be of great help, as it reduces the number of unobservable multipath components per tap. The resulting evolution of the amplitude of the relevant taps is illustrated in FIG. 4 and FIG. 5 together with the estimated and interpolated evolution from the subsampled full RF antenna elements (dashed lines) achieved, for example, by simple spline interpolation explaining the low NMSE in FIG. 6.

An embodiment enables avoiding ADCs and DACs in the Tx chain—as well as in the Rx chain—of the low-cost RF chains, and at the same time achieving an accurate CSI estimate for each antenna element, resulting in a respective high-end precoding performance.

In an embodiment, in a uniform linear array (ULA) with 16 antenna elements, every 4th antenna element may be a full RF antenna element, and the rest of the antenna elements may be low-cost antenna elements. For a quadratic linear array this means that, for example, out of 64 antenna elements 16 full RF chains are needed. For the remaining 48 low-cost antennas, 48 high-end Rx chains including said 48 ADCs may be left out accordingly. This leads to significant cost and energy savings.

In an embodiment, combining UL phase estimations for the full wideband radio channel based on staggered transmission of single-wave sinus signals allows accurate phase estimation despite of the single-bit (or few-bit) ADCs of the low-cost RF chains.

In an embodiment, the antenna array comprises a uniform linear antenna array, a rectangular antenna array, or an antenna array of some other shape.

For phase evaluation, a uniform linear array may be used. However, in an embodiment for 5G phase evaluation, rectangular arrays are used, so that the interpolation is possible over two dimensions. An appropriate grid allocation of antennas with full RF frontends may further improve the interpolation performance. For example, a shift per row may be used, as for more far-off UEs a relatively strong correlation between antenna rows is expected from respective channel measurements.

In an embodiment, the full RF frontends may be sequentially switched to a different subset of antenna elements. This increases the grid of antenna elements with a perfectly known CSI, and eventually ends up in a full knowledge for each antenna element. The interpolation then combines the perfect estimation with the interpolation for the currently single-bit (or few-bit) ADC-only antenna elements. This switching may be done semi-statically or only at the beginning of a data transmission.

In an embodiment, the CSI interpolation may be combined with amplitude estimations, by using the interpolated CSI as a starting point and doing fine tuning afterwards by using proper test signals and varying Rx thresholds for the ADC converters. Thus a single extra step may be sufficient for achieving optimum accuracy.

In an embodiment, eNB may from time-to-time transmit properly chosen pre-coded test signals from each or certain subset of antenna elements, wherein UEs report the estimated Rx signals in UL to eNB using the high-end RF chain antenna elements. This allows eNB to estimate the precoding error and accordingly the CSI interpolation errors for the low-cost antenna elements. This is useful in case the first interpolation is already relatively accurate and close to the ideal CSI.

The combination with the bandwidth extension decreases the number of unobservable multipath components per relevant tap, which may accordingly improve the interpolation quality per tap and accordingly for the full CSI. So far a 20 MHz bandwidth has been assumed, while for 5G, 100 MHz or even 400 MHz may be used, which may lead to a bandwidth expansion factor of 5 to 20.

For moving UEs, the time evolution of the radio channel may provide further information on the underlying radio channel conditions, which may be exploited, for example, by appropriate higher-order singular value decomposition schemes.

Wideband amplitude estimations may be based on multiple transmissions with different thresholds. Such measurements may be included in an appropriate way to improve the overall estimation accuracy.

Typical ULA and rectangular linear arrays (RLA) often use spacing of $\lambda/2$, or close to $\lambda/2$, for proper beamforming. In case of over-the-air generation of intended Rx signals, there is no such beamforming, and some other antenna spacing may be used. For example, smaller antenna spacing may be useful for accurate CSI interpolation.

Figure 10:
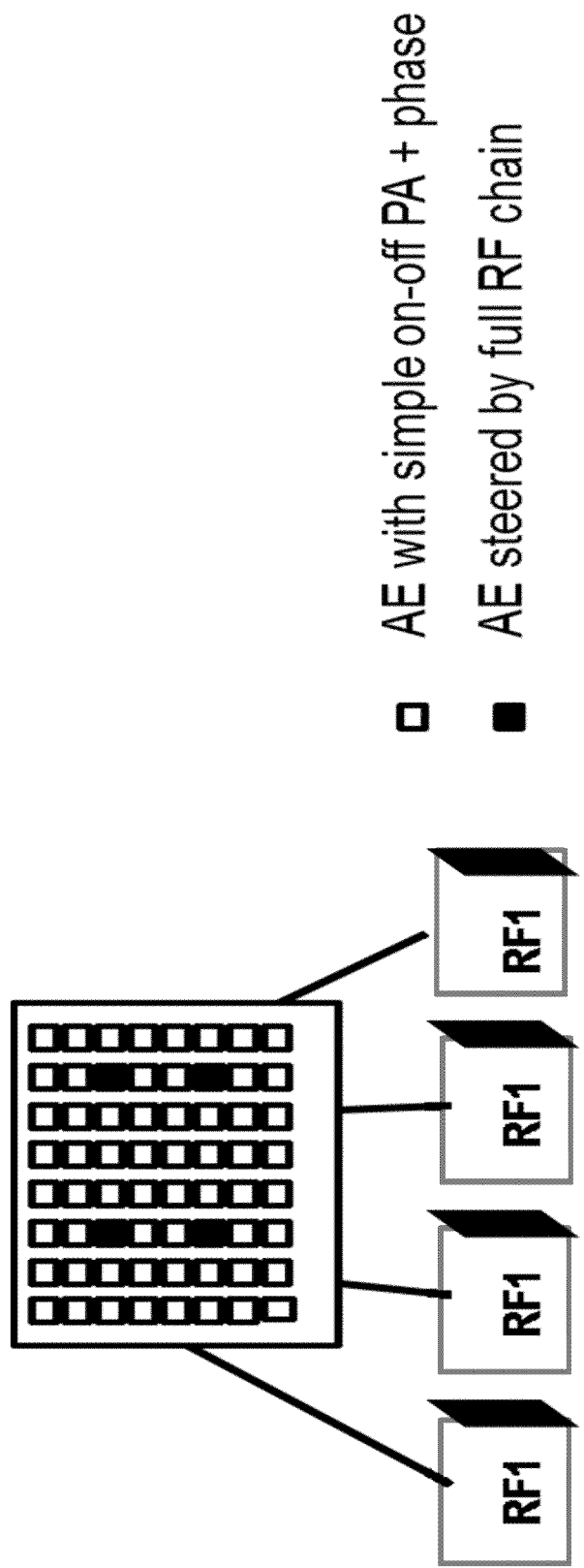
FIG. 10 illustrates antenna arrays combining a few full RF chains with multiple low-cost RF chains according to an embodiment.

FIG. 10 illustrates antenna arrays combining a few full (or high-end) RF chains (black) with multiple low-cost RF chains, having, for example, only a single-bit (or few-bit) ADC/DAC. FIG. 10 illustrates a typical array configuration for channel estimation of massive MIMO arrays comprising many low-cost and few high-end RF chains. Thus a majority of the radio frequency chains comprise low-cost radio frequency chains, and a minority of the radio frequency chains comprise full radio frequency chains FIG. 5 illustrates amplitude evolution of CIR over 16 antenna elements of ULA with $\lambda/2$ spacing at a typical macro site and NLOS UE at 300 m distance using virtual beamforming and artificial mutual coupling. FIG. 5 illustrates the benefits of the virtual beamforming and the artificial mutual coupling, compared to the strong amplitude variations found in FIG. 3.

Figure 9:
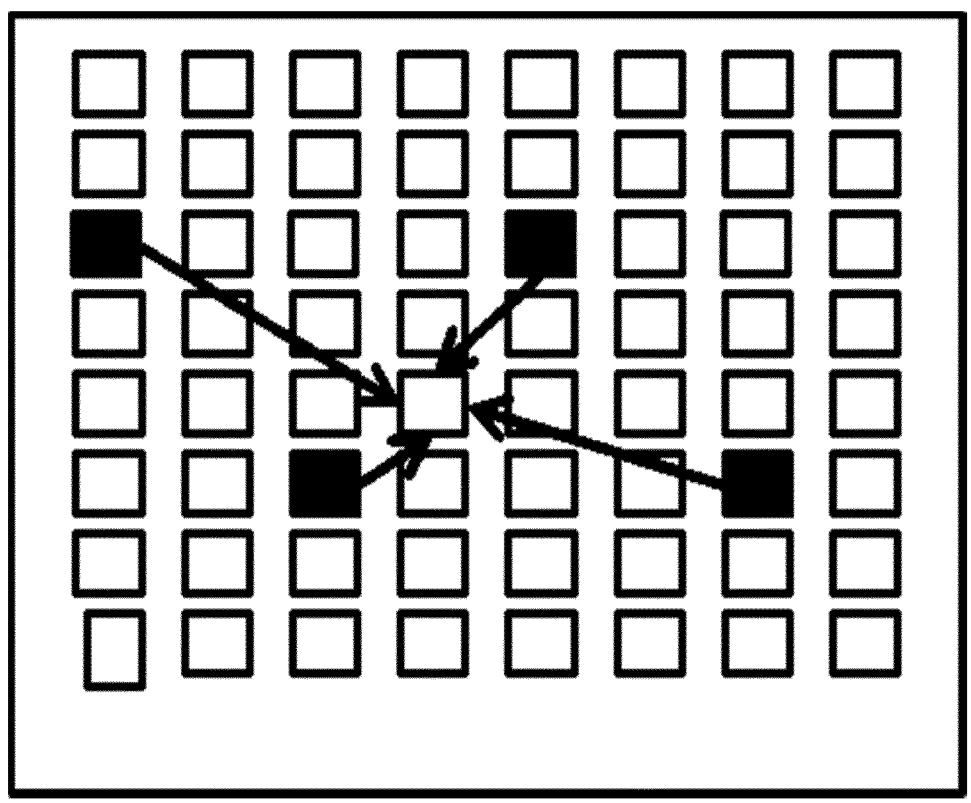
FIG. 9 illustrates a grid of antennas having full RF chains according to an embodiment.

FIG. 9 illustrates the grid of antennas having full (or high-end) RF chains for 2-dimensional interpolation over an azimuth and elevation domain for RLA.

An embodiment enables a low-effort implementation of massive MIMO antenna arrays in a 5G or 4G evolution mobile communication system, providing efficient channel estimation for low-effort antenna elements with limited capabilities of the RF chains. Spatial CSI interpolation is performed for low-effort massive MIMO antennas.

For 5G channel estimation in massive MIMO environments, accurate channel knowledge is needed for each antenna array, in order to perform efficient pre-coding. However, in scenarios where both full and low-cost RF chains are present, transmitting CSI reference signals is a challenge. In an embodiment, channel state information (CSI) for the antenna elements is interpolated with low-cost ADCs using the available CSI estimates for the antenna elements with high-end RF chains.

Figure 12:
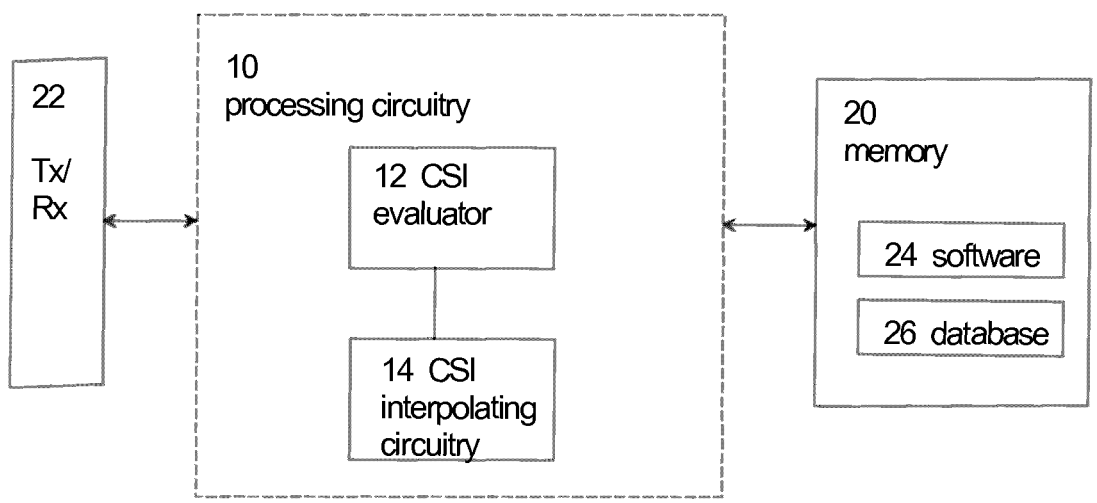
FIG. 12 illustrates a blocks diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the above-described procedures. The at least one processor, the at least one memory, and the computer program code may thus be considered as an embodiment of means for executing the above-described procedures. FIG. 12 illustrates a block diagram of a structure of such an apparatus. The apparatus may be comprised in a transmitter, in a receiver, in a network element or in a network node, e.g. the apparatus may form a chipset or a circuitry in the transmitter, in the receiver, in the network element or in the network node. In some embodiments, the apparatus is the transmitter, the receiver, the network element or the network node. The apparatus comprises a processing circuitry 10 comprising the at least one processor. The processing circuitry 10 may comprise a CSI evaluator 12 configured to obtain (accurate) channel state information for antenna elements with a high-end radio frequency chain, wherein the antenna elements with the high-end radio frequency chain are placed in an antenna array intermittently with antenna elements with a low-cost radio frequency chain. The CSI evaluator 12 may be configured to obtain the (accurate) channel state information, as described above, and output information on the (accurate) channel state information to a CSI interpolating circuitry 14 configured to estimate channel state information for the antenna elements with the low-cost radio frequency chain, by interpolating the (accurate) channel state information obtained for the antenna elements with the high-end radio frequency chain. The antenna elements with the high-end radio frequency chain may be placed in the antenna array in a regular grid with the antenna elements with the low-cost radio frequency chain. The interpolating may be performed over an azimuth direction of the antenna array, over an elevation direction of the antenna array, or over some other direction of the antenna array.

The processing circuitry 10 may comprise the circuitries 12 and 14 as sub-circuitries, or they may be considered as computer program modules executed by the same physical processing circuitry. The memory 20 may store one or more computer program products 24 comprising program instructions that specify the operation of the circuitries 12 and 14. The memory 20 may further store a database 26 comprising definitions for channel estimation of an antenna array, for example. The apparatus may further comprise a radio interface 22 providing the apparatus with radio communication capability with the terminal devices. The radio interface 22 may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the radio interface may be connected to a remote radio head comprising at least an antenna and, in some embodiments, radio frequency signal processing in a remote location with respect to the base station. In such embodiments, the radio interface may carry out only some of radio frequency signal processing or no radio frequency signal processing at all. The connection between the radio interface and the remote radio head may be an analogue connection or a digital connection. In some embodiments, the radio interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 12 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

ADC analog-to-digital converter
MIMO multiple input multiple output
RF chain analog radio frequency chain
DAC digital-to-analog converter
EIRP equivalent isotropically radiated power
UE user equipment
RF radio frequency
Tx transmitter
Rx receiver
TXRU high-end RF chain
TDD time division duplex
FDD frequency division duplex
CSI channel state information
RS reference signal
CTF channel transfer function
UL uplink
DL downlink
CIR channel impulse response
eNB enhanced node-B (LTE base station)

The invention claimed is:

1. A method for channel estimation of an antenna array, the antenna array comprising a first plurality of antenna elements and a second plurality of antenna elements, wherein the first plurality of antenna elements are placed in the antenna array intermittently with the second plurality of antenna elements, the method comprising performing the steps of:
    estimating channel state information for the first plurality of antenna elements by interpolating channel state information obtained for the second plurality of antenna elements;
    the first plurality of antenna elements are connected to a first radio frequency chain and the second plurality of antenna elements are connected to a second radio frequency chain, wherein the first radio frequency chain comprises at least one of a bit resolution that is higher than the second radio frequency chain and a linearity that is higher than the second radio frequency chain.

2. A method according to claim 1, wherein the channel state information estimation is based on a relative placement of the antenna elements in the antenna array.

3. A method according to claim 1, wherein
the resolution of an analog-to-digital converter of the first radio frequency chain is greater than the resolution of an analog-to-digital converter of the second radio frequency chain; and/or
the resolution of a digital-to-analog converter of the first radio frequency chain is greater than the resolution of a digital-to-analog converter of the second radio frequency chain.

4. A method according to claim 1, wherein the method comprises performing the steps of:
estimating the phase of an Rx signal;
using the Rx signal phase estimate to estimate the phase of a wideband radio channel by sequentially transmitting single-frequency reference signals;
changing frequency per reference signal subcarrier from one transmission to another until a full bandwidth has been sampled,
wherein, for time division duplex transmission, each antenna element with the second radio frequency chain is able to estimate its phase from a single user equipment Tx signal;
combining the Rx signal phase estimate with an interpolated channel transfer function to correct phase estimation errors in the interpolated channel transfer function.

5. A method according to claim 4, wherein the method comprises performing the step of:
utilizing the Rx signal phase estimate or channel state information estimate for calibrating second frontend Tx and Rx radio frequency chains.

6. A method according to claim 1, wherein the method comprises performing the steps of:
utilizing a second radio frequency chain for downlink transmission; and
utilizing a first radio frequency chain for uplink reception.

7. A method according to claim 1, wherein the method comprises performing the steps of:
storing received signals as analogue samples in sample and hold devices included in the antenna elements with the second radio frequency chain;
reading the stored analogue samples out in a time-multiplexed manner by using one or more available first analog-to-digital converters from full radio frequency frontends.

8. A method according to claim 1, wherein the antenna array comprises a uniform linear antenna array, a rectangular antenna array, or an antenna array of some other shape.

9. A method according to claim 1, wherein the method comprises:
switching full radio frequency frontends to a different subset of antenna elements, wherein the switching is carried out semi-statically or at the beginning of data transmission.

10. A method according to claim 1, wherein the method comprises:
combining the interpolated channel state information with amplitude estimation, and after that using test signals and varying Rx thresholds for the analog-to-digital converters for achieving more accurate channel state information.

11. A method according to claim 1, wherein the antenna array comprises a massive multiple input multiple output antenna array, wherein a majority of the radio frequency chains in the antenna array comprise second radio frequency chains, and a minority of the radio frequency chains in the antenna array comprise first radio frequency chains.

12. A method according to claim 1, wherein the antenna elements with the first radio frequency chain are placed in the antenna array in a regular grid with the antenna elements with the second radio frequency chain.

13. A method according to claim 1, wherein the interpolating is performed over an azimuth direction of the antenna array, over an elevation direction of the antenna array, or over some other direction of the antenna array.

14. An apparatus comprising
at least one processor;
at least one memory including a computer program code, wherein the at least one memory and the computer program code are configured, with the at least one processor, and
an antenna array, the antenna array comprising a first plurality of antenna elements and a second plurality of antenna elements, wherein the first plurality of antenna elements are placed in the antenna array intermittently with the second plurality of antenna elements, to cause the apparatus to
estimate channel state information for the first plurality of antenna elements by interpolating channel state information obtained for the second plurality of antenna elements;
the first plurality of antenna elements are connected to a first radio frequency chain and the second plurality of antenna elements are connected to a second radio frequency chain, wherein the first radio frequency chain comprises at least one of a bit resolution that is higher than the second radio frequency chain and a linearity that is higher than the second radio frequency chain.

15. A computer program product embodied on a non-transitory distribution medium readable by a computer and comprising program instructions which, when loaded into the computer, execute a computer process comprising causing a network node to perform the method step of claim 1.

* * * * *